United States Patent
Gierke (10) Patent No.: US 9,807,992 B2
(45) Date of Patent: Nov. 7, 2017

(54) CRANKBAIT TUNING DEVICE

(71) Applicant: Gierke Innovations LLC, Hudson, WI (US)

(72) Inventor: Charles C. Gierke, Hudson, WI (US)

(73) Assignee: DeShano, Inc., Harbor Beach, MI (US)

( * ) Notice: Subject to any disclaimer, the term of this patent is extended or adjusted under 35 U.S.C. 154(b) by 178 days.

(21) Appl. No.: 14/935,124

(22) Filed: Nov. 6, 2015

(65) Prior Publication Data

US 2017/0071180 A1   Mar. 16, 2017

Related U.S. Application Data

(60) Provisional application No. 62/218,236, filed on Sep. 14, 2015.

(51) Int. Cl.
*A01K 97/00* (2006.01)
*A01K 91/06* (2006.01)
*A01K 85/00* (2006.01)

(52) U.S. Cl.
CPC .............. *A01K 97/00* (2013.01); *A01K 85/00* (2013.01); *A01K 91/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 841,472 | A | * 1/1907 | Vanderhershen | B25B 23/12 279/90 |
| 2,472,124 | A | * 6/1949 | Randall | B21J 15/48 72/479 |
| 4,295,774 | A | 10/1981 | Manini et al. | |
| 4,461,193 | A | 7/1984 | Gruber et al. | |
| 4,492,054 | A | * 1/1985 | Barnhart | A01K 85/16 43/42.22 |
| 4,597,335 | A | 7/1986 | Slavens | |
| 4,807,388 | A | * 2/1989 | Cribb | A01K 85/16 43/42.22 |
| 5,425,193 | A | * 6/1995 | Gelb | A01K 97/00 43/4 |

(Continued)

*Primary Examiner* — Christopher P Ellis
(74) *Attorney, Agent, or Firm* — Kagan Binder, PLLC (57) ABSTRACT

Disclosed herein is a crankbait tuning device comprising a main lever arm comprising a first main lever arm major side, a second main lever arm major side, and a first handle portion, the first lever arm major side comprising a first interlocking portion and a main lever arm threaded portion; a torque setting knob comprising a mating threaded portion, wherein the mated threaded portion is attached to the main lever arm threaded portion in mated threaded fashion; an opposing lever arm comprising a second handle portion and a first jaw portion, the opposing lever arm pivotally attached to the main lever arm; and a movable lever arm comprising a first movable lever arm major side and a second movable lever arm major side, wherein the first movable lever arm major side comprises a second jaw portion and a second interlocking portion, wherein the movable lever arm first major side is disposed between the torque setting knob and the main lever arm and pivotally attached to the main lever arm such that the first interlocking portion is contacted with and engaged with the second interlocking portion.

6 Claims, 6 Drawing Sheets

(56) References Cited

U.S. PATENT DOCUMENTS

| | | | |
|---|---|---|---|
| 5,557,874 A * | 9/1996 | Pietrandrea | A01K 97/00 289/17 |
| 6,012,361 A | 1/2000 | Wooster, Jr. et al. | |
| 6,128,975 A | 10/2000 | Schley et al. | |
| 6,283,193 B1 | 9/2001 | Finch et al. | |
| 6,502,482 B1 | 1/2003 | Putsch et al. | |
| 7,096,760 B2 | 8/2006 | Schmode et al. | |
| 7,146,887 B2 | 12/2006 | Hunter | |
| 7,533,512 B2 | 5/2009 | Levati et al. | |
| 7,880,717 B2 | 2/2011 | Berkley et al. | |
| 7,950,638 B2 | 5/2011 | Su | |
| 8,182,501 B2 | 5/2012 | Houser et al. | |
| 8,888,791 B2 | 11/2014 | Jaramillo et al. | |
| 2006/0137189 A1 | 6/2006 | Dole | |
| 2006/0174734 A1 | 8/2006 | Hunter | |
| 2007/0299427 A1 | 12/2007 | Yeung et al. | |
| 2008/0168870 A1 | 7/2008 | Caravello | |
| 2008/0256718 A1 | 10/2008 | Mattson et al. | |
| 2013/0305587 A1 * | 11/2013 | Takahashi | A01K 85/16 43/42.49 |
| 2014/0358150 A1 | 12/2014 | Kaufman et al. | |
| 2015/0208628 A1 * | 7/2015 | Coniglio | A01K 85/00 43/42.24 |

\* cited by examiner

CRANKBAIT TUNING DEVICE

CROSS-REFERENCE TO RELATED APPLICATION

This application claims priority to U.S. Provisional Application No. 62/218,236, filed on Sep. 14, 2015, the entirety of which is herein incorporated by reference.

TECHNICAL FIELD

The invention relates to devices for adjusting crankbait lures.

BACKGROUND

One of the most popular and effective fishing lures is the crankbait. Crankbaits are trolled or cast by anglers and are designed to appear like a wounded minnow traveling through the water. Crankbaits are highly effective at catching many types of fish in both in fresh water and saltwater. Anglers often take great pride in having numerous different sizes and colors of crankbaits and often have a tackle box full of just these lures, with an array of colors and patterns. Crankbaits are designed, produced, and sold by manufacturers in the United States and throughout the world.

Crankbaits are typically composed of five main parts: 1) a lure body having a shape resembling a small fish, such as a minnow; 2) a diving bill that is inserted or molded into the forward part of the lure body, causing the lure body to run deep and creating a wobbling motion as the body is moved through water; 3) hook hangers to hold the hooks, inserted or molded to the bottom of the lure body; 4) hooks, typically two treble hooks; and 5) a line tie, which is a semicircular piece of wire molded or screwed into the diving bill or molded into or screwed into a portion of lure body such as the nose of the fish-like shape. The line tie is where an angler attaches fishing line to the crankbait.

When the crankbait is pulled through water via fishing line attached to the line tie, the shape of the lure body assisted by the diving bill creates a side-to-side wobble that is thought to create a wounded minnow appearance. This wounded minnow appearance can provoke a desirable strike reaction from gamefish such as muskellunge ("muskie"), red fish, stripers, salmon, and the like.

Not all crankbaits are the constructed the same, as artisans create various designs thereof and different makes and models. Further, there is often significant variation in the movement of crankbaits sold as identical items. Thus, for example, an angler can purchase four crankbaits of the same apparent make, model, and size and get different lure motion and/or fishing results from each crankbait. The reason for this variability is that the line tie can be off of the true center axis of the lure body. What seem to be minor increments of the line tie off of the center axis prevents a crankbait from tracking "true" or straight in the overall sense as it is pulled through the water, that is, prevents the motion from evenly wobbling from side to side. A crankbait that tracks perfectly straight is said to be "in tune." Many experienced anglers agree that a lure that tracks straighter catches more fish. Thus it is desirable to have the line tie perfectly set on the center axis of the lure body.

Some crankbaits are out of tune even when brand new. Crankbaits can also be knocked out of tune by striking a rock heavily during fishing activities, wherein the wire line tie can shift off center and thus a once "tuned" lure becomes out of tune.

Conventionally, anglers use a conventional needle nose pliers, or a slotted tuner having either a "pencil" style or a "key" style to tune the lure. If the crankbait appears to veer to the left as it is pulled through the water, the line tie is slightly bent to the right, thereby bringing the line tie more toward true "0". In contrast, if the crankbait appears to veer to the right as it is pulled through the water, the lure can be tuned by slightly bending the line tie to the left.

Crankbait tuning thus requires a high level of experience and dexterity as well as a practiced eye, because it can be difficult to determine whether an appropriate adjustment has been made simply by looking. To the frustration of many anglers, "overtuning" (bending the line tie too far) is often constituted by any visible movement of the line tie during the tuning attempt. Complicating the difficulty is that tuning is often attempted while the user is in a boat on the water, and the movement of the boat can make tuning much more difficult or even impossible. Bad weather conditions such as wind, rain, and the like make the task even more difficult.

There are no known tuning tools that remedy the difficulty of this seemingly simply operation. Sellers of crankbait tuners invariably instruct the user to carefully and lightly bend the line tie to accomplish tuning. Even when a user with great experience and skill follows these instructions, overtuning can result.

Conventional tuning devices are rigid and imprecise in the application of force, with no inherent control in application of torque or pressure to bend the line tie. This lack of control results in the difficulties experienced by the user described above. Even if the user is greatly skilled (the inventor has 17 years of professional guiding experience) the minute increments needed to adjust the lure causes overtuning to become essentially inevitable and in some cases the lure is eventually ruined by multiple attempts to tune.

When a conventional device, such a needle nose pliers are used, the amount of force and/or torque is applied by the user. If the squeezing action by the user's hand is light, then less force is applied in the plier jaws for example. Also if a conventional plier is used and the squeezing action by the hand is heavy and very strong, then a heavy force is being applied in the plier jaws, a force equivalent to the strong squeezing action by the hand. The same factors apply in using known rigid slotted devices such as those described in U.S. Pat. No. 5,425,193 or key shaped slotted devices such as Tune-A-Fish (sold at www.reefrunner.com). Conventional slotted pencil devices apply torque based only the applied force or exertion of the user. In sum, conventional devices used to tune crankbaits apply force and torque as selected by the user and subject to trial and error.

There is a need in the industry for a lure-tuning tool that allows a user to precisely apply a suitable amount of torque to a line tie to accomplish acceptable tuning sufficient to provide a crankbait that tracks "true". There is a need in the industry for a lure-tuning tool that allows a user to precisely apply a suitable amount of pressure to a line tie to accomplish acceptable tuning sufficient to provide a crankbait that tracks "true". There is a need in the industry to minimize the probability of overtuning the line tie of a crankbait lure. There is a need in the industry to increase the ease and efficiency of tuning a crankbait lure.

SUMMARY

Disclosed herein is a crankbait tuning device comprising a main lever arm comprising a first main lever arm major side, a second main lever arm major side, and a first handle portion, the first lever arm major side comprising a first interlocking portion and a main lever arm threaded portion; a torque setting knob comprising a mating threaded portion, wherein the mated threaded portion is attached to the main lever arm threaded portion in mated threaded fashion; an opposing lever arm comprising a second handle portion and a first jaw portion, the opposing lever arm pivotally attached to the main lever arm; and a movable lever arm comprising a first movable lever arm major side and a second movable lever arm major side, wherein the first movable lever arm major side comprises a second jaw portion and a second interlocking portion, wherein the movable lever arm first major side is disposed between the torque setting knob and the main lever arm and pivotally attached to the main lever arm such that the first interlocking portion is contacted with and engaged with the second interlocking portion.

The invention is a plier type device for tuning fishing lures such as crankbaits. The tuning device provides a maximum preset force, torque, or both to the line tie of a crankbait lure. The tuning device enables a user to tune a crankbait without overtuning.

In some embodiments, the tuning device is capable of applying an adjustable amount of torque, pressure, or both to a line tie. In some embodiments, the tuning device causes a clicking noise to occur when a preset amount of torque, force, or both has been applied, to inform the operator that the preset value of torque and/or force has been applied. In some embodiments, the tuning device provides a new position to inform the operator that a preset amount of torque has been applied.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto.

Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "about 1 to about 5" and "1 to about 5" and "about 1 to 5" unless specifically limited by context.

As used herein, the word "substantially" modifying, for example, a property, a measurable quantity, a method, a position, a value, or a range, employed in describing the embodiments of the disclosure, refers to a variation that does not affect the overall recited property, quantity, method, position, value, or range thereof in a manner that negates an intended property, quantity, method, position, value, or range. The effect on methods that are modified by "substantially" include the effects caused by variations in type or amount of materials, tolerances, settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

Discussion

Figure 1:
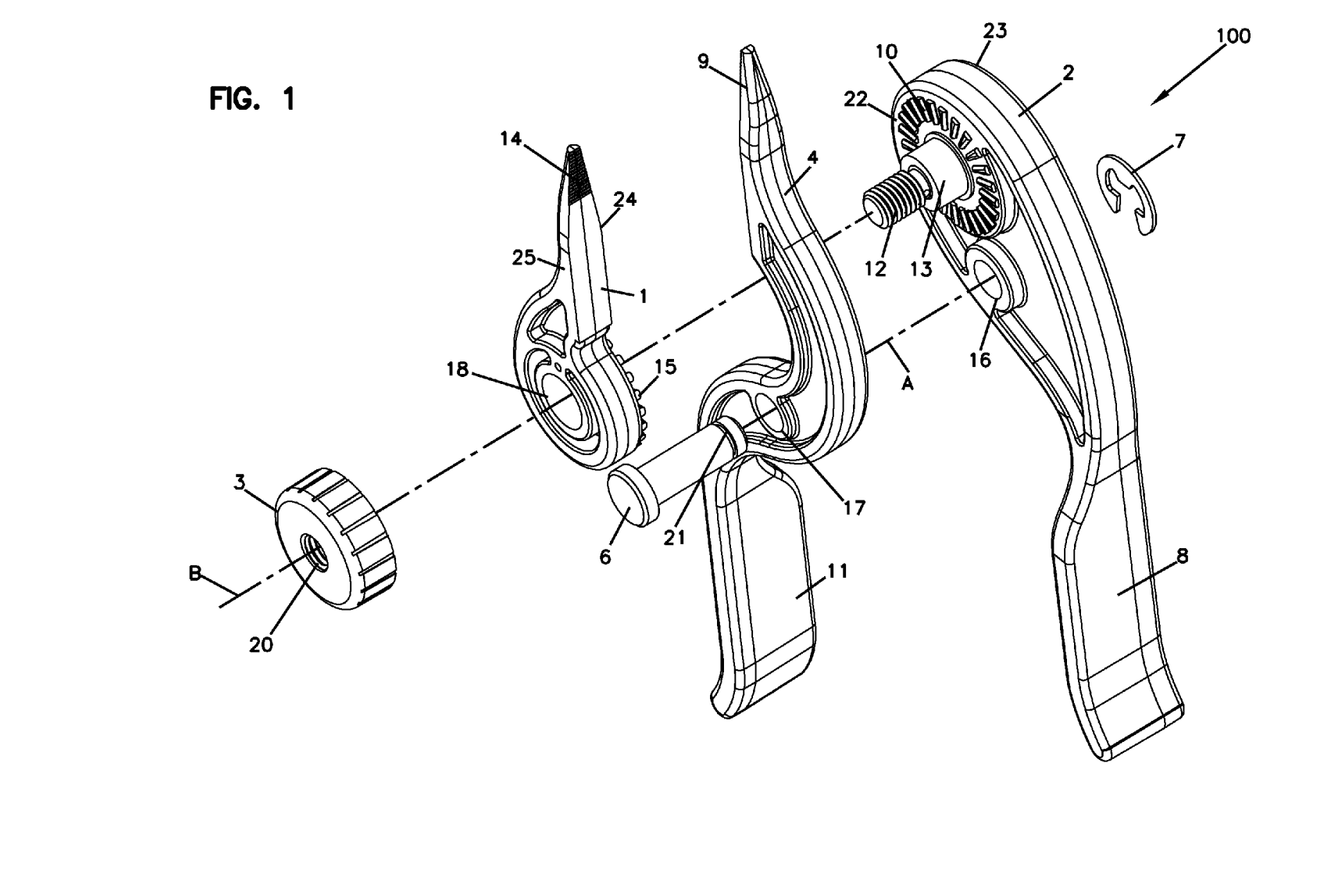
FIG. 1 is an exploded view of a tuning device of the invention.

Referring to FIG. 1, tuning device 100 comprises main lever arm 2, opposing lever arm 4, movable lever arm 1, torque setting knob 3, pin 6, and retainer clip 7. Main lever arm 2 of tuning device 100 includes first major side 22, second major side 23, and first handle portion 8. First major side 22 includes first interlocking rib portion 10 and main lever arm boss 13 with main lever arm threaded portion 12. In embodiments, main lever arm threaded portion 12 has about 10 to 30 threads per inch, or about 15 to 30, or about 10 to 25, or about 15 to 25, or about 15 to 20, or about 18 threads per inch. Main lever arm 2 further defines first pin receiving hole 16 that proceeds through main lever arm 2 from first side 22 to second side 23. Opposing lever arm 4 of tuning device 100 includes second handle portion 11 and first jaw portion 9. Opposing lever arm 4 further defines second pin receiving hole 17 that proceeds through opposing lever arm 4.

Movable lever arm 1 of tuning device 100 includes second jaw portion 14, movable lever arm first major side 24, and movable lever arm second major side 25. First major side 24 includes and second interlocking rib portion 15. Movable lever arm 1 defines main lever arm threaded portion receiving hole 18 that proceeds from first major side 24 to second major side 25. Torque setting knob 3 of tuning device 100 includes mating threaded portion 20. Pin 6 of tuning device 100 includes groove portion 21.

Tuning device 100 is assembled by attaching opposing lever arm 4 to main lever arm 2, and attaching movable lever arm 1 to main lever arm 2; the two attachments may be suitably made in the stated order or in the opposite order, as will be appreciated by one of skill. In somewhat more detail, first pin receiving hole 16 is aligned with second pin receiving hole 17 as shown by hash line A; then pin 6 is inserted through holes 16, 17 such that groove 21 protrudes from second side 23 of main lever arm 2; then retainer clip 7 is attached to pin 6 by sliding clip 7 across groove portion 21 of pin 6, thereby pivotally securing opposing lever arm 4 to main lever arm 2. Movable lever arm 1 is attached to main lever arm 2 by aligning movable lever arm 1 and main lever arm 2 as shown by hash line B; then main lever arm threaded portion 12 is inserted through main lever arm threaded portion receiving hole 18 of movable lever arm 1 such that main lever arm threaded portion 12 protrudes through second major side 25 of movable lever arm 1; then torque setting knob 3 is affixed to main lever arm threaded portion 12 by screwing torque setting knob 3 onto main lever arm threaded portion 12 using mating threaded portion 20. The attachment of movable lever arm 1 to main lever arm 2 causes movable lever arm 1 to be disposed over main lever arm boss 13 and further causes secured engagement of first interlocking rib portion 10 with second interlocking rib portion 15.

When assembled, tuning device 100 allows a user to grip handle portions 8, 11 and urge handle portions 8, 11 together, which in turn urges first jaw portion 9 toward and into contact with second jaw portion 14 as will be appreciated by one having familiarity with conventional plier type devices. However, as the user urges first and second jaw portions 9, 14 into pressurized contact, torque setting knob 3 controls the amount of pressure that may be applied during the contact. In somewhat more detail, when the user urges handle portions 8, 11 together, contacting jaw portions 9, 14 with force, a threshold amount of force causes engaged interlocking rib portions 10, 15 to move rotatably against each other, and no further force may be applied at contacted jaw portions 9, 14. Instead, force in excess of the threshold force, applied by the user via handles 8, 11 causes interlocking rib portions 10, 15 to move rotatably against each other. Threshold force is adjusted by screwing knob 3 in a tighter or looser manner, causing interlocking rib portions 9,14 to be contacted in a tighter or looser mated position respectively. In this way, the user may suitably adjust the threshold force that may be applied to jaw portions 9,14. The opposing lever arm 4 holds lure body or the side of the diving bill of the crankbait when the device is being used to apply torque to a line tie.

Torque is the counterpart of the force in angular motion and is defined as the tendency of a force to rotate an object about the axis, a fulcrum, or a pivot.

In some related embodiments, the threshold force is not adjustable by the user, that is, the tuning device does not include main lever arm threaded portion 12 or mating threaded portion 20 and instead these sections are replaced by an affixed mated attachment of movable lever arm 1 relative to main lever arm 2. The affixed mated attachment provides a fixed threshold force that is set by the manufacturer to provide a threshold force that corresponds to a suitable force for tuning a crankbait. Due to the large variations of lure types, size, configurations and materials used the threshold force applied at the jaws of the device ranges from about 1 lb to 200 lb, or about 2 lb to 200 lb, or about 5 lb to 200 lb, or about 10 lb to 200 lb, or about 20 lb to 200 lb, or about 50 lb to 200 lb, or about 100 lb to 200 lb, or about 1 lb to 3 lb, or about 1 lb to 5 lb, or about 1 lb to 10 lb, or about 1 lb to 25 lb, or about 1 lb to 50 lb, or about 1 lb to 100 lb, or about 1 lb to 150 lb, or about 5 lb to 150 lb, or about 5 lb to 100 lb.

However, the tuning device of the invention is suitably designed to apply up any force range. This force range can be changed by 1) changing the torque setting knob; 2) changing the spring type or diameter of the wire; or 3) changing the mechanical advantage of the device.

In some embodiments, a suitable force for tuning a "small" crankbait is about 1 lb to 10 lb, for example about 3 lb to 8 lb. In some embodiments, a suitable force for tuning a "large" crankbait lure is about 15 lb to 100 lb, for example about 30 lb to 50 lb. A "small" lure is defined as a crankbait lure used to fish for panfish, typically though not always employed in conjunction with a 4 lb test line. A "large" lure is defined as a crankbait lure used to fish for muskie or salt water fish, typically though not always employed in conjunction with a 40 lb test line. The wire of the loop to be tuned in the crankbait is often made of mild steel and has a diameter that ranges from about 0.02 inches for a small crankbait to about 0.05 inches for a large crankbait.

In embodiments, a manufacturer sets the threshold force during the manufacturing of the tuning device. In some embodiments, settings of the device are provided for "small", "medium" and "large" crankbait lure tuning that are reflected by settings provided on the tuning knob that correspond to the proper amount of force or torque applicable to the device when the knob is set to the appropriate setting.

In any of the embodiments above or below, the various parts of the tuning device are made from a range of materials suitable for a plier type device. Thus, a range of metals, plastics, reinforced or filled plastics, and the like are suitably employed to form the parts of the tuning device. Metals such as aluminum, steel such as stainless steel, and cast iron or thermoplastic or thermoset materials such as polyolefins, polyamides, acrylonitrile-butadiene-styrene (ABS) copolymers, high-impact polystyrene (HIPS), polyimides such as nylon 6, nylon 6,6, or nylon 12, or other engineering thermoplastics or thermosets and filled or fiber reinforced versions of these materials are also suitably used. A blend of such materials is also suitably employed in various devices as will be appreciated by one of skill. In embodiments, different materials or blends thereof are employed to form the various parts of the tuning device.

In embodiments, the size and/or proportion of the various parts of the device are changed to address larger and smaller line ties of the crankbait lures employed to fish for larger and smaller gamefish.

In any of the embodiments above or below, interlocking rib portions 10, 15 may be replaced with another design or configuration that provides for adjustable interlocking disposition when main lever arm 2 is compressed against movable lever arm 1. For example, a series of cubic, cuboid, parallelopiped, or semicircular protrusions "bumps" may be employed in place of rib portions 10 or 15 or both.

In any of the embodiments above or below, pin 6 or another pin article substantially as described herein may be replaced with another fastener for fastening objects or materials together in pivotal fashion, as will be appreciated by one of skill. For example, screws, rivets, slotted spring pins, nut/bolt pairs, and the like are suitably employed in place of the pin 6/retainer clip 7 securing means. Additionally, in some embodiments, one or more washers are further employed in any of the fastening means described herein, including washers disposed between knob 3 and movable arm 1, or between movable arm 1 and main lever arm 2.

Figure 2:
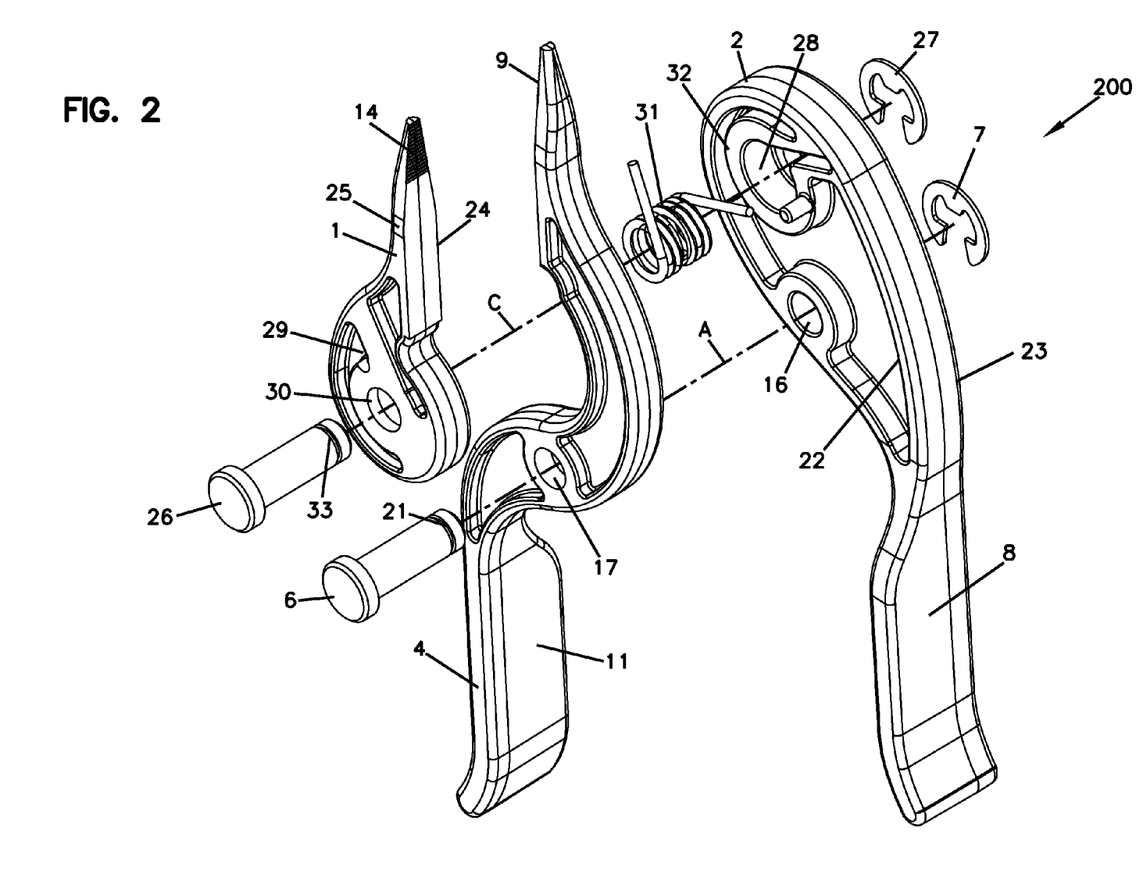
FIG. 2 is an exploded view of another tuning device of the invention.

A related embodiment is shown in FIG. 2. Referring to FIG. 2, tuning device 200 comprises main lever arm 2, opposing lever arm 4, movable lever arm 1, first pin 6, second pin 26, first retainer clip 7, second retainer clip 27, and torsion spring 31. Main lever arm 2 of tuning device 200 includes first major side 22, second major side 23, first handle portion 8, and display ridge 32. Main lever arm 2 further defines first receiving hole 16 which proceeds through main lever arm 2 first side 22 to second side 23. Main lever arm 2 further defines second receiving hole 28 that proceeds through main lever arm 2 from first side 22 to second side 23. Opposing lever arm 4 includes second handle portion 11 and first jaw portion 9. Opposing lever arm 4 further defines third receiving hole 17 that proceeds through opposing lever arm 4. First and second pins 6, 26 define groove portions 21, 33 respectively.

Movable lever arm 1 of tuning device 200 includes movable lever arm first major side 24, movable lever arm second major side 25, and second jaw portion 14. Movable lever arm 1 further defines fourth receiving hole 30 that proceeds through moveable lever arm 1 from first side 24 to second side 25. Movable lever arm 1 further defines window 29 that proceeds through first side 24 to second side 25. Optionally, window 29 is covered by a visibly transparent or translucent glass or plastic portion (not shown).

Tuning device 200 is assembled by attaching opposing lever arm 4 to main lever arm 2, and attaching movable lever arm 1 to main lever arm 2; the two attachments may be suitably made in the stated order or in the opposite order, as will be appreciated by one of skill. In somewhat more detail, first receiving hole 16 is aligned with second receiving hole 17 as shown by hash line A; then pin 6 is inserted through holes 16, 17 such that groove 21 of pin 6 protrudes from second side 23 of main lever arm 2; then first retainer clip 7 is attached to pin 6 by sliding clip 7 across groove portion 21 of pin 6, thereby pivotally securing opposing lever arm 4 to main lever arm 2. Movable lever arm 1 is attached to main lever arm 2 by aligning movable lever arm 1 and main lever arm 2 as shown by hash line C; then second pin 26 is inserted through fourth receiving hole 30 of movable lever arm 1 such that second pin 26 protrudes through second major side 25 of movable lever arm 1; then second pin 26 is inserted through torsion spring 31 as shown by hash line C; then second pin 26 is inserted through second receiving hole 28 such that second pin 26 protrudes through second major side 23 of main lever arm 2. Finally, second retainer clip 27 is attached to second pin 26 by sliding clip 27 across groove portion 33 of second pin 26, thereby securing movable lever arm 1 to main lever arm 2.

When assembled, tuning device 200 allows a user to grip handle portions 8, 11 and urge handle portions 8, 11 together using hand force, which in turn urges first jaw portion 9 toward second jaw portion 14 as will be appreciated by one having familiarity with conventional plier type devices. However, as the user urges first and second jaw portions 9, 14 into pressurized contact, the torsion spring 31 controls or limits the amount of force that may be applied during the contact. In somewhat more detail, when the user urges handle portions 8, 11 together, contacting jaw portions 9, 14 with force, a threshold amount of force causes closing force of the torsion spring 31 to engage movable lever arm 1 to move rotatably against the main lever arm 2. Torsion spring 31 is designed and adapted to obtain a specific maximum force such that once the specific maximum force is exceeded by hand pressure applied by the user to handle portions 8,11 and thus to jaw portions 9,14 movable lever arm 1 is urged rotatably move away from the opposing lever arm 4.

When device 200 is assembled, window 29 is operable as a "view finder" window that enables a user to view display ridge 32. Display ridge 32 is situated on main lever arm 2 and encircles a portion of second receiving hole 28 substantially as shown in FIG. 2. In embodiments, the display ridge 32 has markings such as has lines, numbers, letters or some other indicia printed or embossed thereon. When movable lever arm 1 is in the closed position, wherein "closed position" is defined as when jaw portions 9, 14 are in contact, window 29 provides a view of one or more markings present on display ridge 32. When the closed position is characterized as contact of jaw portions 9, 14 accompanied by substantial lack of force applied to the contact, window 29 is positioned to display a first marking, such as "1", "A" or another such mark that indicates to the user that the jaw portions 9, 14 are in the closed position but substantially no force is being applied thereto. One or more additional markings present on display ridge 32 are disposed in arcuate fashion around display ridge 32. As increasing force is applied by the user to handle portions 8, 11 and translated to jaw portions 9, 14, window 29 moves relative to display ridge 32 and one or more of the additional markings present on display ridge 32 become visible through window 29. As viewed by a user, the one or more additional markings are disposed in a manner that indicates an increasing amount of force is being applied to jaw portions 9, 14. If the user applies an amount of force corresponding to the threshold amount of force of torsion spring 31, window 29 displays the last of the one or more additional markings present on display ridge 32 indicating to the user that the maximum force has been applied to jaw portions 9, 14.

In some embodiments, the markings on display ridge 32 will read in order from "1" to "5". In some such embodiments, contact of jaw portions 9, 14 without substantial force results in window 29 displaying marking "1". Contact of jaw portions 9, 14 with increasing force results in window 29 displaying marking "2" or "3" or "4". Contact of jaw portions 9, 14 with force corresponding to the threshold amount of force of torsion spring 31 results in window 29 displaying marking "5". Many variations of the type and number of the markings, relative shape of the window 29 and display ridge 32, and so forth are easily envisioned by one of skill. In this way, a user is enabled to suitably, repeatedly and reproducibly adjust the force that is applied to jaw portions 9, 14.

Figure 3:
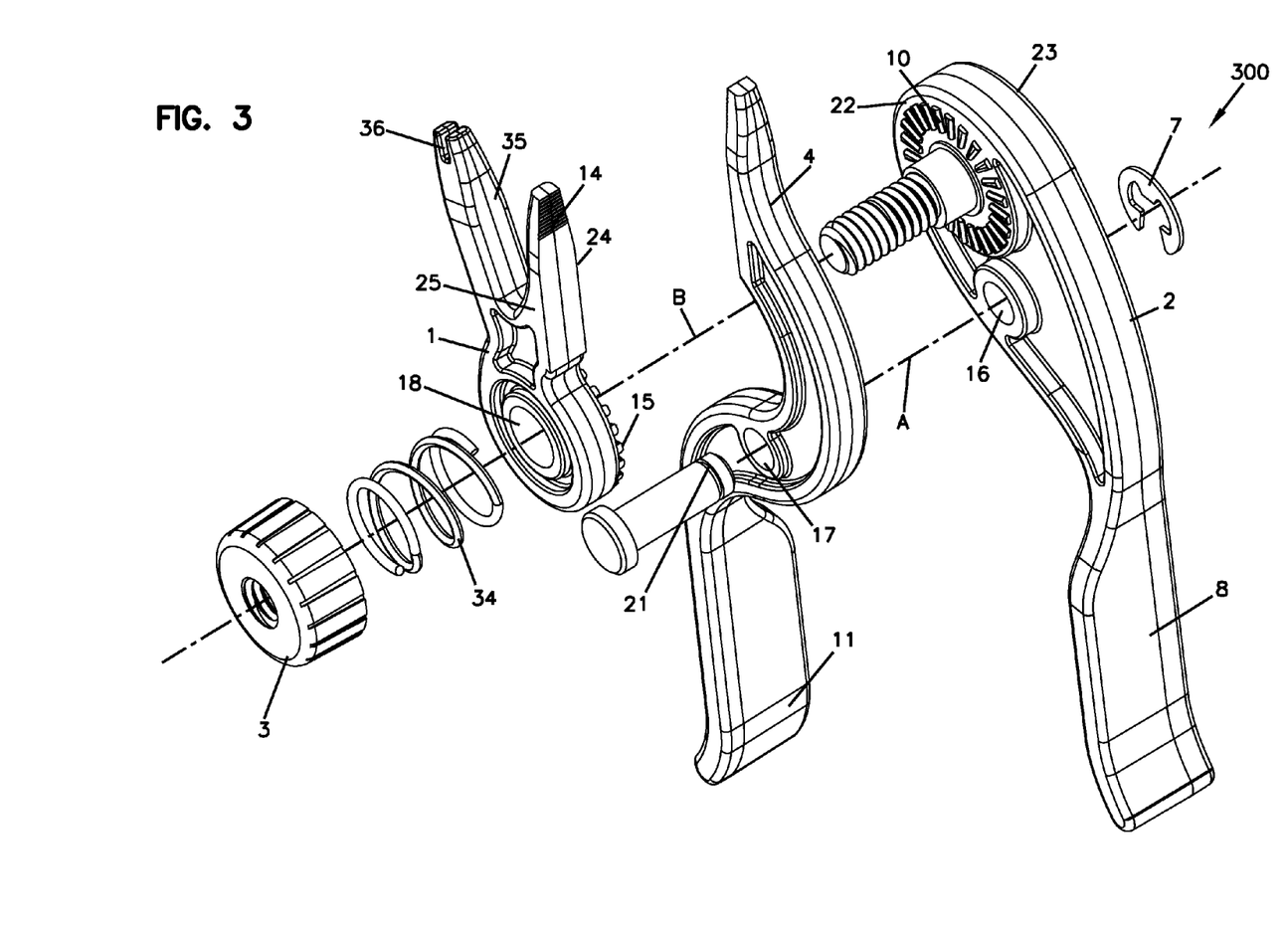
FIG. 3 is an exploded view of another tuning device of the invention.

Another related embodiment is shown in FIG. 3. FIG. 3 is similar to the embodiment of FIG. 1 except for the following differences. Referring to FIG. 3, tuning device 300 includes torque compression spring 34 disposed between movable lever arm 1 and torque setting knob 3. Additionally, movable lever arm 1 includes pencil tuner portion 35 defining slot 36.

When assembled, tuning device 300 allows a user to first grip handle portion 8 only, urging pencil tuner portion 35 into contact with a line tie of a crankbait, further engaging slot 36 with the line tie as will be appreciated by one having familiarity with pencil tuner devices for crankbait lures. However, as the user urges pencil tuner 35 into pressurized contact by urging handles 8, 11 together, torque setting knob 3 controls the amount of pressure that may be applied during the contact by compressing interlocking rib portions 10, 15 into tighter or looser contact. In somewhat more detail, when the user engages slot 36 with the line tie, a threshold amount of force causes engaged interlocking rib portions 10, 15 to move rotatably against each other, and no further force may be applied at contacted pencil tuner portion 35. Instead, force in excess of the threshold force, applied by the user via handle 8, causes interlocking rib portions 10, 15 to move rotatably against each other. Threshold force is adjusted by screwing knob 3 in a tighter or looser manner, causing interlocking rib portions 10, 15 to be contacted in a tighter or looser mated position respectively. In this way, the user may suitably adjust the threshold force that may be applied to pencil tuner portion 35.

The torque compression spring 34 provides compression on interlocking rib portion 10, 15 when held against movable lever arm 1 by knob 3. As compression is increased by turning knob 3, it will require more force to release interlocking rib portion 10, 15.

In an exemplary embodiment, torque compression spring 34 is capable of applying pressure at 40.00 lbs./in when situated substantially as described above. If main lever arm threads 12 are 18 threads/inch, this corresponds to about 2.22 lbs of force per turn of the torque setting knob. One of skill will understand that springs of various sizes and levels of pressure application can be used.

Knob 3 fits both the inside and outside of spring 34 to assure alignment of the spring as it is compressed. Each turn of the knob 3 will increase or decrease the force on the interlocking rib portions 10, 15 and it will take increasing or decreasing hand force applied to the handle portions 8, 11 to "break" the torque setting, that is, dislodge the interlocked rib portions 10, 15.

Figure 4:
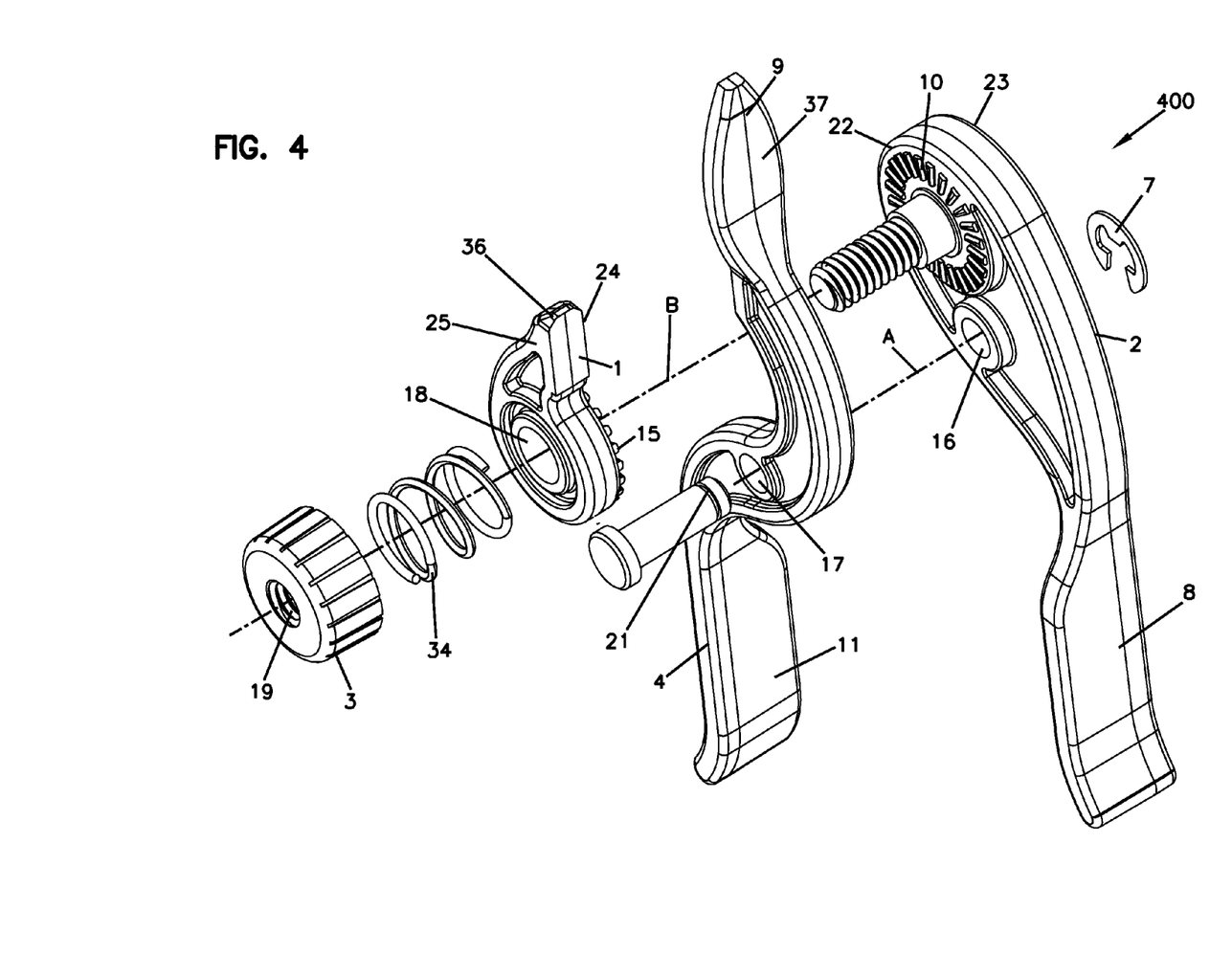
FIG. 4 is an exploded view of another tuning device of the invention.

Another related embodiment is shown in FIG. 4. FIG. 4 is similar to the embodiment of FIG. 3 except for the following differences. Instead of pencil tuner portion 34 and jaw portion 9 of movable arm 1 as shown in FIG. 3, movable arm 1 of tuning device 400 includes short nose portion 36. Additionally, jaw portion 9 of opposing lever arm 4 has a spoon shaped portion 37. The spoon shaped portion 37 is designed and adapted to securely cradle the sides of the crankbait lure body, increasing the precision of the tuning operation during use.

Figure 5:
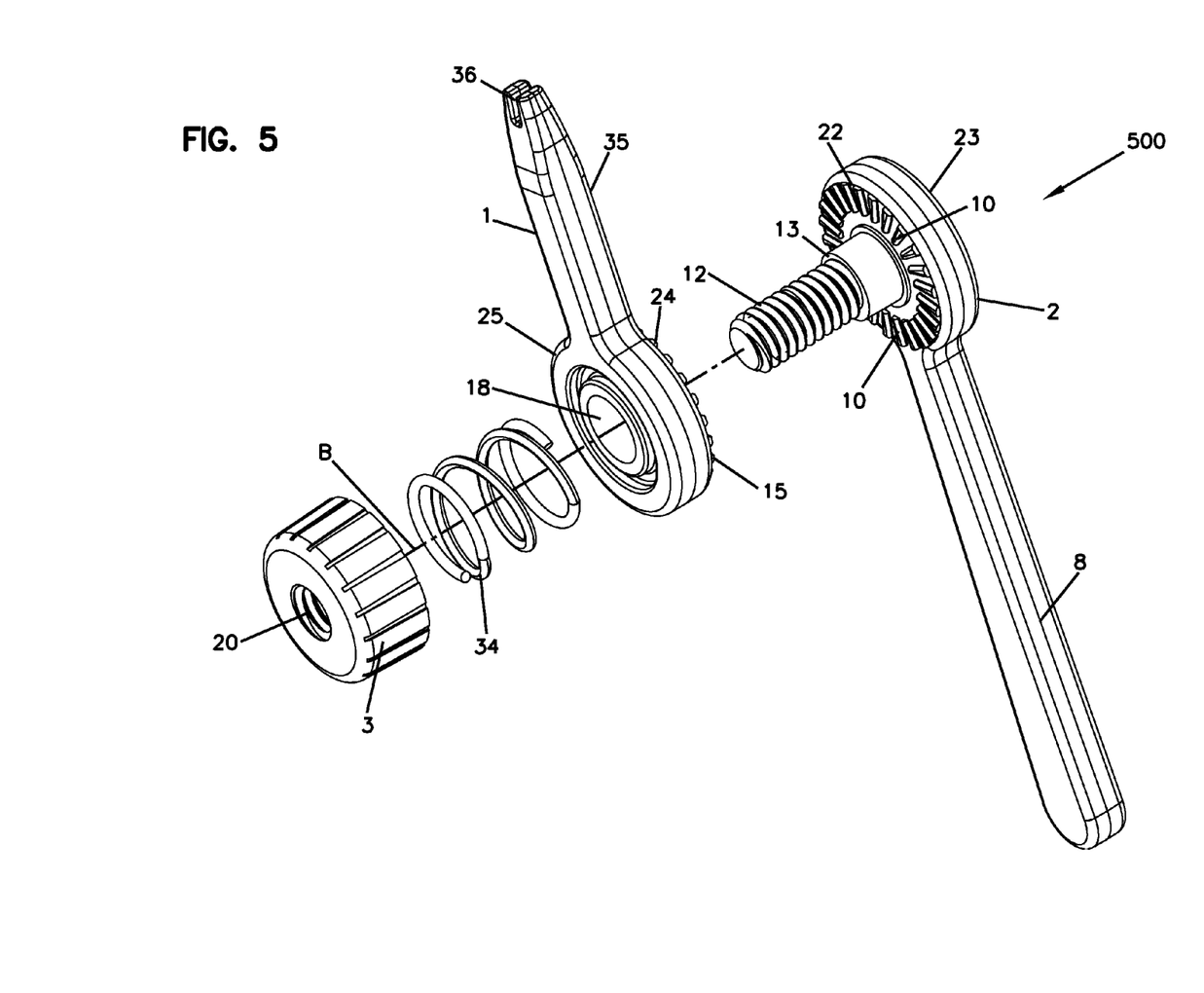
FIG. 5 is an exploded view of another tuning device of the invention.

Another related embodiment is shown in FIG. 5. Referring to FIG. 5, tuning device 500 comprises main lever arm 2, movable lever arm 1, torque setting knob 3, and torque compression spring 34. Main lever arm 2 of tuning device 500 includes first major side 22, second major side 23, and single handle portion 8. First major side 22 includes first interlocking rib portion 10 and main lever arm boss 13 with main lever arm threaded portion 12.

Movable lever arm 1 of tuning device 500 includes pencil tuner portion 35 defining slot 36, movable lever arm first major side 24, and movable lever arm second major side 25. First major side 24 includes second interlocking rib portion 15. Movable lever arm 1 further defines main lever arm threaded portion receiving hole 18 that proceeds from first major side 24 to second major side 25. Torque setting knob 3 of tuning device 500 includes mating threaded portion 20.

To assemble tuning device 500, movable lever arm 1 is attached to main lever arm 2 by aligning torque setting knob 3, torque compression spring 34, movable lever arm 1, and main lever arm 2 as shown by hash line B; then main lever arm boss 13 is inserted through main lever arm threaded portion receiving hole 18 of movable lever arm 1 such that main lever arm threaded portion 12 protrudes through second major side 25 of movable lever arm 1; then torque setting knob 3 fits over torque compression spring 34 and is affixed to main lever arm threaded portion 12 by screwing torque setting knob 3 onto main lever arm threaded portion 12 using mating threaded portion 20. The attachment of movable lever arm 1 to main lever arm 2 causes movable lever arm 1 to be disposed over main lever arm boss 13 and further causes secured engagement of first interlocking rib portion 10 with second interlocking rib portion 15.

The action of torque compression spring 34, urged against main lever arm 2 by knob 3, provides an adjustable force when a user grips handle 8 to urge pencil tuner portion 35 into contact with a line tie of a crankbait as will be appreciated by one having familiarity pencil-type crankbait tuning devices. However, as the user urges pencil tuner portion 35 into pressurized contact, torque setting knob 3 controls the amount of pressure that may be applied during the contact by compressing interlocking rib portions 10, 15 into tighter or looser contact. In somewhat more detail, when the user engages slot 36 with the line tie, a threshold amount of force causes engaged interlocking rib portions 10, 15 to move rotatably against each other, and no further force may be applied at contacted pencil tuner portion 35. Instead, force in excess of the threshold force, applied by the user via handle 8, causes interlocking rib portions 10, 15 to move rotatably against each other. Threshold force is adjusted by screwing knob 3 in a tighter or looser manner, causing interlocking rib portions 10, 15 to be contacted in a tighter or looser mated position respectively. In this way, the user may suitably adjust the threshold force that may be applied to pencil tuner portion 35.

Other Embodiments

The tuning device of the invention includes a reset mechanism to enable the return of the Movable Lever Arm to reset to the original closed position or starting position (before the torque setting was overcome).

The reset mechanism can be achieved by various arrangements one arrangement is by using a Floating Push Button Threaded Boss and modified spring in a manner that will twist the movable lever arm to it's original position when the reset button is depressed.

The modified spring has two free ends. One free end of the wire fits over the movable lever arm threads and is inserted and held in place at the base of the reset button. The reset button acts as a boss to hold the Movable Lever Arm. The second free wire end of the modified spring would be twisted some 90 degrees opposite the Opposing Lever Arm at installation and inserted into a hole on the Movable Lever Arm. The spring would then be compressed as the Torque Setting Knob is screwed on.

The slotted pencil versions of the tuning device, embodiments 300 and 500, require a single lever arm action by the operator to unlock the interlocked ribs.

When the mated ribs unlock and then lock again there is a clicking noise. The operator stops applying pressure on the clicking noise. The operator stops applying pressure when the interlocked ribs unlock and the handle opens/angles toward/or moves toward the side the torque is being applied to—the line tie.

When force is applied by hand pressure the mated interlocked ribs of the main lever arm and the main lever arm extension will unlock and move in a direction away from the Opposing Lever Arm.

The amount of force that is applied is based on how tight the Torque Setting Knob is twisted onto the Threaded Pivot Boss. The tighter the Torque Setting Knob is turned in a clockwise manner the tighter the Torque Compression Spring is compressed. The Threaded Pivot boss is permanently fixed to the Main lever Arm. Therefore twisting the Torque Compression knob increases the pressure limit or the amount of pressure that can be applied.

The level of compression of the Torque Compression Spring creates a pressure limit that once reached unlocks the interlocked ribs and the Movable Lever Arm moves away from the Opposing Lever Arm.

The adjustable Torque Setting Knob and Torque Compression Spring establishes the amount of pressure that can be applied by hand pressure. If the Torque Setting knob is set in a position to lightly compress the Torque Setting Spring then a light amount of pressure exerted by hand pressure will unlock the interlocked ribs of the Main Lever Arm and The Main Lever Arm Extension. As the Main lever Arm Extension becomes unlocked or unmated a clicking noise is audible and the Main Lever Arm Extension moves away from the Opposing Lever Arm. When the click is heard and the movement away from the Opposing Arm is seen the person applying the force will know that the set amount of force has been reached.

Experimental

Figure 6:
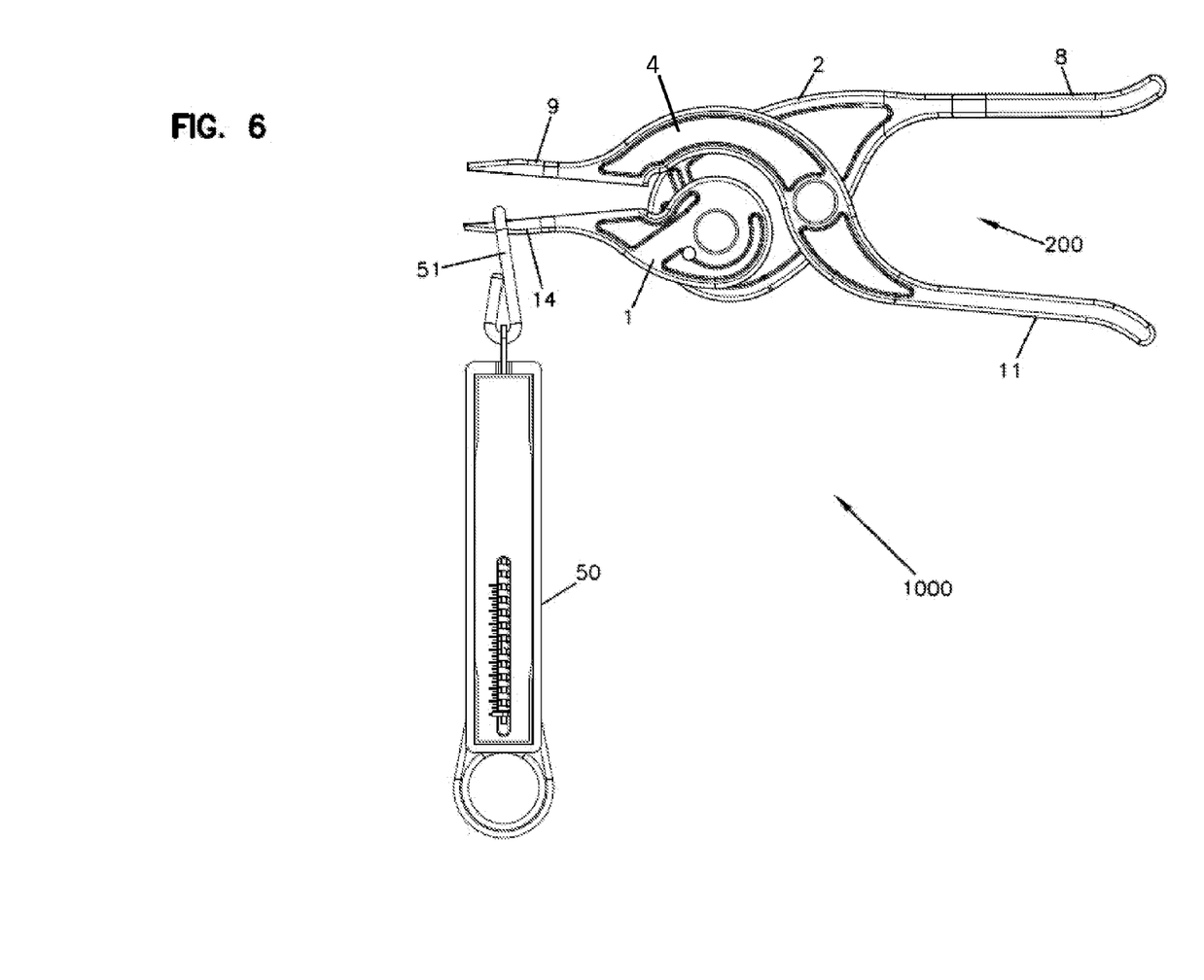
FIG. 6 is a schematic view a test device used to test the load required to tune a crankbait using a tuning device of the invention.

A 3D stereolithographic printer was used to print a model crankbait lure tuning device 200 according to FIG. 2, having dimensions commensurate with an overall length of opposing lever arm 4 (as represented in FIG. 2) of about 6 inches. The material used to print the device was a UV curable acrylate; 3D printing was accomplished by curing layers of the acrylate using UV irradiation. The control knob on the device was set to a level used to tune/adjust a small lure. The device was set in a test jig 1000 as shown in FIG. 6. Referring to FIG. 6, tuning device 200 was placed in a vise grip mounted to a table surface and a force scale 50 was inserted between the jaws 9,14 of the device. Force scale 50 includes a spring (not shown) calibrated to measure force from 0-15 lb (obtained from Cardoza Creations of Oroville, Calif.) and an attachment hook 51 attached to the force scale 50 in a manner wherein the hook 51 is operably connected to the calibrated spring in order to measure the force placed on the spring. Hook 51 is attached to jaw portion 14.

Using test jig 1000, we measured the maximum force that could be applied to the device by urging handles 8, 11 together.

To use the tuning device 200, a user must be able to tune/change the lure path, that is, bend the wire loop of the crankbait lure to one side or the other side. In order to bend the wire loop, the wire must bend in at least two loci. A simplified calculation of this is a beam deflection times 2 (one for each side of the loop). Taking measurement from a "small" crankbait lure (SHAD RAP® #5, obtained from Normark Corporation of Minnetonka, Minn.) and "large" crankbait lure (MAGNUM SHALLOW INVADER®, obtained from MUSKY INNOVATIONS® LLC of Cleveland, Wis.) wire diameter and loop height, the force measurements in Table 1 were produced using the following equation, where units of force are in pounds (lb) as measured using the test jig described above.

End load on cantilever beam with single fixed support:

$$\delta = FL^3/3EI$$

where
L=length of beam
$\delta$=deflection of beam
F=force (proportion of loco weight being resisted by axlebox)
E=Young's Modulus
I=moment of inertia of beam

TABLE 1

Force calculated for knob setting on the device.

| Factor | Small Lure | Large Lure |
|---|---|---|
| Wire Diameter (in) | 0.025 | 0.05 |
| Beam Height (in) | 0.2 | 0.37 |
| Deflection (in) | 0.001 | 0.001 |
| E (Youngs Modulus) | 3.00E+07 | 3.00E+07 |
| Inertia moment | 1.92E−08 | 3.07E−07 |
| Jaw closing force needed/beam (lbs) | 5.4 | 27.2 |
| Jaw closing force needed for 2 beams/loop (lbs) | 10.8 | 54.5 |

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

The invention claimed is:

1. A crankbait tuning device comprising
a main lever arm comprising a first main lever arm major side, a second main lever arm major side, and a first handle portion, the first lever arm major side comprising a first interlocking portion and a main lever arm threaded portion;
a torque setting knob comprising a mating threaded portion, wherein the mated threaded portion is attached to the main lever arm threaded portion in mated threaded fashion;
an opposing lever arm comprising a second handle portion and a first jaw portion, the opposing lever arm pivotally attached to the main lever arm; and
a movable lever arm comprising a first movable lever arm major side and a second movable lever arm major side, wherein the first movable lever arm major side comprises a second jaw portion and a second interlocking portion, wherein the movable lever arm first major side is disposed between the torque setting knob and the main lever arm and pivotally attached to the main lever arm such that the first interlocking portion is contacted with and engaged with the second interlocking portion.

2. The device of claim 1 wherein the main lever arm threaded portion has about 10 to 30 threads per inch.

3. The device of claim 1 further comprising a torque compression spring disposed between the torque setting knob and the movable lever arm.

4. The device of claim 3 wherein the torque compression spring is capable of applying pressure at 40.00 lb/in.

5. The device of claim 1 wherein the interlocking portions are interlocking rib portions.

6. The device of claim 1 further comprising a pencil tuning portion.

\* \* \* \* \*